(12) United States Patent
Cipollini et al.

(10) Patent No.: US 6,703,151 B2
(45) Date of Patent: Mar. 9, 2004

(54) COMPACT PRECOOLER

(75) Inventors: Ned E. Cipollini, Enfield, CT (US); Antonio M. Vincitore, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 86 days.

(21) Appl. No.: 09/837,502

(22) Filed: Apr. 18, 2001

(65) Prior Publication Data

US 2002/0155332 A1 Oct. 24, 2002

(51) Int. Cl.[7] .................................................. H01M 8/18
(52) U.S. Cl. ............................. 429/20; 429/17; 429/26
(58) Field of Search ............................. 429/13, 17, 19, 429/26, 20, 24; 165/154

(56) References Cited

U.S. PATENT DOCUMENTS

| 3,976,507 A | 8/1976 | Bloomfield |
|---|---|---|
| 5,270,127 A | 12/1993 | Koga et al. |
| 5,482,791 A | 1/1996 | Shingai et al. |
| 5,770,162 A | 6/1998 | Niknafs |
| 6,077,620 A | 6/2000 | Pettit et al. |
| 6,103,411 A | 8/2000 | Matsubayashi et al. |
| 2002/0076587 A1 * | 6/2002 | Foley et al. .................. 429/20 |

FOREIGN PATENT DOCUMENTS

| JP | 6-215785 | 8/1994 |
|---|---|---|
| JP | 2000-82478 | 3/2000 |

* cited by examiner

Primary Examiner—Patrick Ryan
Assistant Examiner—Raymond Alejandro
(74) Attorney, Agent, or Firm—Bachman & LaPointe

(57) ABSTRACT

In a near ambient pressure operated auto-thermal reformer fuel gas system, a precooler between the auto-thermal reformer and shift converter. The precooler includes a spraying water inlet, an inlet for the reformed gas and a packing of high surface area material which increases the available surface area for water evaporation in the precooler so as to effectively cool the hot reformed gas.

5 Claims, 2 Drawing Sheets

COMPACT PRECOOLER

BACKGROUND OF THE INVENTION

The present invention relates to a fuel cell system and, more particularly, a reformed fuel fuel cell system to produce electricity. Reformed fuel fuel cell systems typically use one of three types of fuel processors, namely, a catalytic steam reformer, an auto-thermal reformer, or catalytic partial oxidizer as are commonly known in the art.

Fuel cell power plants for producing electricity are well known in the art. U.S. Pat. No. 3,976,507 discloses a pressurized fuel cell power plant which operates at a pressure greater than ambient pressure. While the power plant disclosed in U.S. Pat. No. 3,976,507 is effective and useful for generating electricity, the fact that the plant operates under pressure does not render it particularly useable for a reformed fuel fuel cell system with vehicular applications. In a low pressure reformed fuel fuel cell system, the size of the system and the pressure drop experienced during operation of the system are critical factors in producing an effective, compact system which is useable in vehicular applications.

Naturally, it would be highly desirable to produce a reformed fuel fuel cell system which can operate effectively at ambient pressure while maintaining a compact size which is suitable for use in the system. In order to achieve the foregoing, each component in the reformed fuel fuel cell system must be designed in a manner which takes into consideration the allowable pressure drop which may occur within the system and the sized limitation constraints necessary to make such a system practical. Therefore, any savings in size and pressure drop which can be obtained with any of the system components is highly desirable. Accordingly, it is a principal object of the present invention to provide a compact precooler which is useful in a reformed fuel fuel cell system.

It is a particular object of the present invention to provide a compact precooler which is effective in reducing the temperature of a fuel processor exit gas stream while ensuring minimal pressure drop.

It is a still further object of the present invention to provide a compact precooler between a fuel processor and shift converter which provides sufficient residence time to effectively cool the reformer exit gas stream to a desired temperature and evaporate all water used in the precooler.

It is a still further object of the present invention to provide a process for cooling a fuel processor exit gas stream in an effective manner while limiting pressure drop.

Further objects and advantages of the present invention will appear hereinbelow.

SUMMARY OF THE INVENTION

The foregoing objects and advantages are obtained by way of the present invention by providing, in a near ambient pressure operated reformed fuel fuel gas system, a precooler between the fuel processor and shift converter. The precooler includes an atomizing water inlet, an inlet for the reformed gas and a packing of high surface area material which increases the vaporizing surface for the water in the precooler so as to effectively cool the hot reformed gas in a more compact unit.

The present invention is further drawn to a process for cooling a reformed exit gas from a fuel processor operated at near ambient pressure so as to ensure a cooled reformed gas at the desired temperature wherein the gas stream is substantially free of water droplets. By vaporizing all the water in the precooler, the process ensures a minimal pressure drop from the inlet of the precooler to the outlet of the precooler.

BRIEF DESCRIPTION OF THE DRAWINGS

Further features and advantages of the present invention will be more fully apparent in light of the following detailed description of the preferred embodiment of the present invention as illustrated in the accompanying drawings wherein.

DETAILED DESCRIPTION

The process of the apparatus of the present invention will be described hereinbelow with reference to FIGS. 1 and 2.

Figure 1:
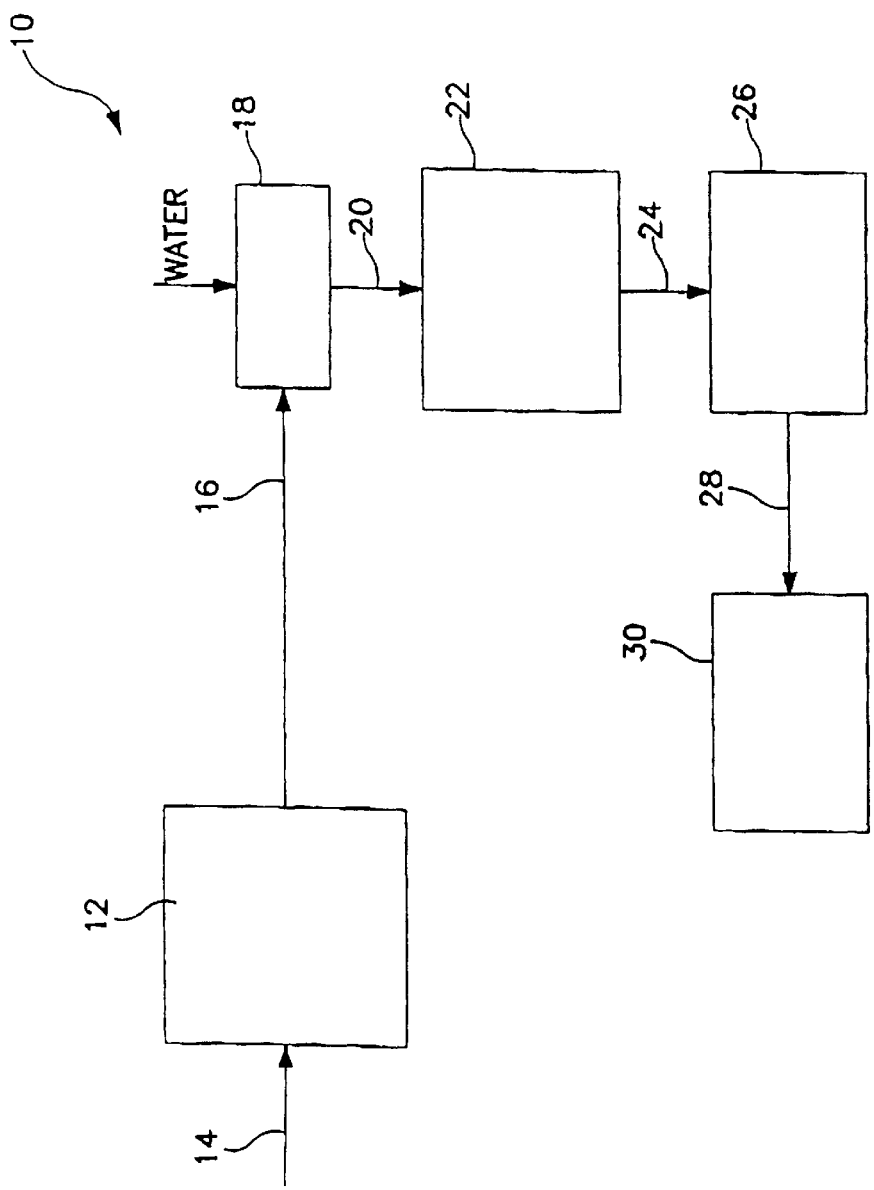
FIG. 1 is a schematic representation of an auto-thermal reformer fuel cell system employing the precooler of the present invention.

FIG. 1 is a schematic representation of an auto-thermal reformer fuel cell system which may employ the precooler of the present invention for carrying out the process of the present invention. It should be appreciated that the precooler may be used in any fuel cell system with a fuel processor using fuel such as natural gas, gasoline, diesel fuel, naphtha, fuel oil and like hydrocarbons. The invention will be described with reference to use in a gasoline fueled auto-thermal reformer fuel cell system.

With further reference to FIG. 1, the fuel cell system 10 includes an auto-thermal reformer 12 which receives through line 14 a gas mixture comprising gasoline, steam and air which is reformed in reformer 12 into a reformed gas comprising primarily nitrogen, hydrogen, carbon dioxide, water vapor and carbon monoxide. The reformed gas leaves the reformer through line 16 and enters precooler 18 where the reformed gas is processed in accordance with the present invention in a manner to be discussed hereinbelow. The hot reformed gas discharged from the reformer 12 is at a temperature of between about 800 to 1200° F. when entering the precooler 18. The precooler functions to reduce the temperature of the gas stream to a temperature of less than or equal to 500° F. at the outlet line 20 of the precooler prior to introduction into the shift converter 22. The shift converter 22 receives the cooled reformed gas containing nitrogen, carbon dioxide, water vapor, carbon monoxide and hydrogen and processes the reformed gas in the presence of a catalyst to convert the majority of carbon monoxide of the reformed gas such that the gas exiting the shift converter is primarily a gas mixture comprising nitrogen, carbon dioxide and hydrogen. Discharge line 24 feeds the gas mixture to a selective oxidizer unit 26 where any remaining carbon monoxide gas is further reduced and the gas fed by a line 28 to fuel cell 30.

The gasoline fueled auto-thermal reformer fuel cell system which employs the precooler in the present invention is designed to operate at near ambient pressure and with the precooler typically mounted in a vertical downward orientation. Accordingly, the system pressure drop must be limited and controlled in a very precise manner. The pressure drop at the rated power of the fuel cell across the precooler from inlet to outlet should be less than 10 inches of water. In addition, the size of the precooler must be compact for use in a mobile fuel cell system which has limited space capacity. Finally, the precooler of the present invention while being compact and minimizing pressure drop from the inlet to the outlet thereof, must also reduce the temperature of the hot reformed gas to the desired shift converter inlet temperature in order for the system to operate effectively without damaging the catalyst employed in the shift converter. While the precooler was conceived for vehicular fuel cell power plant use, other applications to stationary fuel cell power plants are envisioned.

Figure 2:
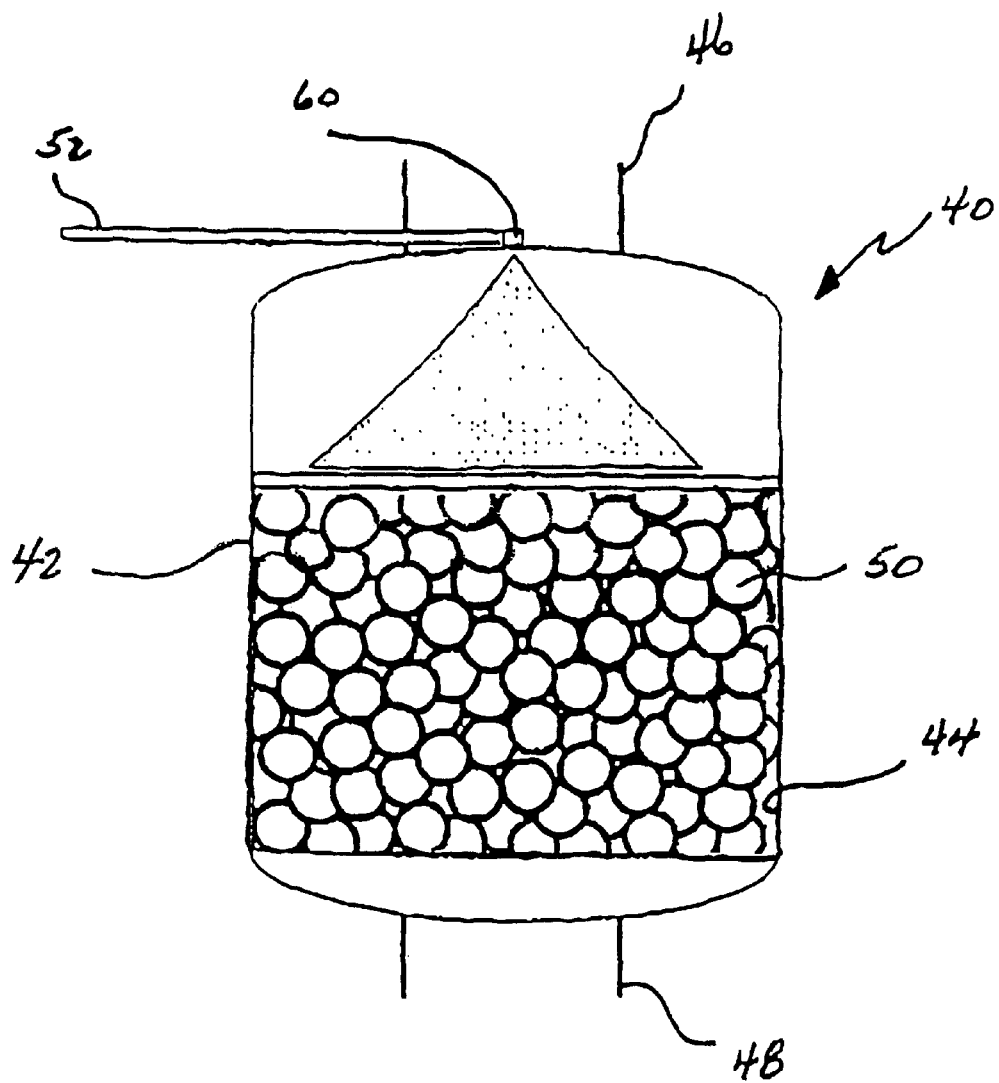
FIG. 2 is a cross sectional view through the precooler in accordance with the present invention.

FIG. 2 illustrates a precooler design in accordance with the present invention which meets all of the specifications described above with regard to size, pressure drop, and temperature reduction. FIG. 2 is a cross sectional view of the precooler. The precooler 40 comprises a housing 42 which defines a chamber 44. The housing 42 has a reformed gas inlet 46 to chamber 44 and a cooled reformed gas outlet 48 for discharge of the cooled reformed gas to the shift converter. Positioned within the housing 42 in the chamber 44 is a high surface area particulate material 50.

A nozzle 60 atomizes water introduced into the chamber 44 via line 52 for cooling the hot reformed gas therein. The nozzle 60 may take the form of any nozzle known in the art and should be designed to provide water droplets of less than about 100 microns at rated flow conditions which are about 27 lbs./hr. of $H_2O$. As noted above, the chamber 44 is packed with a high surface area material which completes vaporization of water droplets in the precooler 40 so as to ensure that no water droplets are in the cooled reformed gas discharged through outlet 48. In addition, the compacted material in chamber 44 also assists in cooling of the reformed gas stream prior to discharge through outlet 48. Suitable materials used in the chamber 44 include steel wool, ceramic and metal pellets, reticulated ceramic foam, reticulated metal foam and honeycomb monoliths.

Besides obtaining the necessary cooled reformed gas stream, it is desirable to ensure substantially complete vaporization of water in the precooler 40 so as to limit the pressure drop from the inlet 46 to the outlet 48 to not more than 10 inches of water. Complete vaporization of the water is ensured in the precooler of the present invention by providing the high surface area material in chamber 44. The high surface area material ensures that water droplets will be vaporized therein prior to passing through outlet 48.

As noted above, the process of the present invention requires the cooling of a hot reformed gas in a precooler from an inlet temperature of between about 800 to 1200° F. to an outlet temperature of preferably between 400 to 500° F. In addition, any water used to assist in the cooling of the reformed gas must be completely vaporized within the cooling zone prior to discharge. In order to ensure the foregoing at rated power conditions certain parameters must be maintained. The mass flow rate of reformed gas should be between about 290 to 350 lbs./hr., the mass flow rate of water between 25 to 35 lbs/hr. The inlet water temperature is desirably between 100 to 150° F. In addition, the surface area of the material in chamber 50 should be between about 400 to 600 $ft^2/ft^3$. Also, as noted above, the pressure drop at rated power from the reformed gas inlet to the reformed gas outlet is less than 10 inches of water. The assembly can operate at flow conditions from rated power down to a flow rate of about 10% of rated power. At the low flow conditions the increased residence time allows for complete vaporization of the injected water.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a hydrocarbon fueled reformed gas fuel cell system having a rated power, a process for cooling reformed gas from a fuel processor prior to feeding the reformed gas to a shift converter comprising the steps of:

providing a cooling zone having a hot gas inlet, a cooled gas outlet and a water inlet;

feeding the reformed gas at a temperature of between 800 to 1200°F. to the hot gas inlet;

packing the cooling zone with a packing material;

spraying water as droplets and contacting the droplets with the packing material and the reformed gas so as to cool the reformed gas and vaporize the water; and removing a stream of cooled reformed gas from the cooling zone wherein the cooled reformed gas is at a temperature between 400 and 500°F. and the stream is substantially free of water droplets.

2. A process according to claim 1 wherein the fuel processor is selected from the group consisting of an autothermal reformer, a thermal steam reformer and a partial oxidation device.

3. A process according to claim 1 wherein a pressure drop at rated power from the reformed gas inlet to the reformed gas outlet is less than 10 inches of water.

4. A process according to claim 1 wherein the packing material has a surface area between 400 and 600 $ft^2/ft^3$.

5. A process according to claim 1 wherein the packing material is selected from the group consisting of steel wool, ceramic pellets, metal pellets, reticulated ceramic foam, reticulated metal foam and honeycomb monoliths.

* * * * *